(12) United States Patent
Buckley et al.

(10) Patent No.: US 7,995,565 B2
(45) Date of Patent: Aug. 9, 2011

(54) SYSTEM AND METHOD FOR MANAGING CALL CONTINUITY IN IMS NETWORK ENVIRONMENT USING SIP MESSAGING

(75) Inventors: Adrian Buckley, Tracy, CA (US);
Andrew Allen, Mundelein, IL (US);
Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/542,462

(22) Filed: Oct. 3, 2006

(65) Prior Publication Data

US 2008/0080480 A1    Apr. 3, 2008

(51) Int. Cl.
*H04L 12/66* (2006.01)

(52) U.S. Cl. ..... 370/353; 370/354; 370/356; 379/88.17; 455/403; 455/428

(58) Field of Classification Search .................. 370/328, 370/356, 352, 401, 471, 392; 455/445; 379/88.17
See application file for complete search history.

(56) References Cited

U.S. PATENT DOCUMENTS

| | | |
|---|---|---|
| 2004/0184435 A1 | 9/2004 | Westman |
| 2004/0203680 A1* | 10/2004 | Sylvain ............ 455/417 |
| 2005/0058125 A1* | 3/2005 | Mutikainen et al. ........ 370/354 |
| 2005/0195762 A1 | 9/2005 | Longoni et al. |
| 2005/0233727 A1 | 10/2005 | Poikselka et al. |
| 2006/0209805 A1* | 9/2006 | Mahdi et al. ............ 370/352 |
| 2006/0268900 A1 | 11/2006 | Larsson et al. |
| 2007/0014281 A1* | 1/2007 | Kant ............... 370/352 |
| 2007/0041367 A1 | 2/2007 | Mahdi |
| 2007/0049281 A1* | 3/2007 | Chen et al. ............ 455/445 |
| 2007/0058788 A1* | 3/2007 | Mahdi et al. ............. 379/88.17 |
| 2007/0064886 A1 | 3/2007 | Chiu et al. |
| 2007/0165612 A1* | 7/2007 | Buckley ............. 370/356 |
| 2007/0183410 A1 | 8/2007 | Song et al. |
| 2007/0254625 A1* | 11/2007 | Edge ............... 455/404.1 |

FOREIGN PATENT DOCUMENTS

| | | |
|---|---|---|
| EP | 1 811 745 A1 | 7/2007 |
| JP | 2005 27119 | 1/2005 |
| JP | 2006 222822 | 8/2006 |
| KR | 1020060114349 A | 11/2006 |

(Continued)

OTHER PUBLICATIONS

European Search Report; European Patent Office; Sep. 17, 2007; 10 pages.

(Continued)

*Primary Examiner* — Simon Sing
*Assistant Examiner* — Simon King
(74) *Attorney, Agent, or Firm* — The Danamraj Law Group, P.C.

(57) ABSTRACT

In one embodiment, a scheme is disclosed for managing call continuity in a network environment including a circuit-switched (CS) network and an IP multimedia subsystem (IMS) network wherein a SIP Invite message having a Domain Transfer-URI contained in the Request-URI that is operable to trigger a return of a routable number is utilized. Responsive to the SIP Invite message from a UE device, a network node provides a SIP response message (e.g., SIP 380 (Alternative Service) Response) which includes one or more radio access technologies and an alternative domain available to the UE device for continuing a call from one domain to another domain.

47 Claims, 6 Drawing Sheets

FOREIGN PATENT DOCUMENTS

| TW | 251406 | 7/1995 |
|---|---|---|
| TW | 200408256 | 5/2004 |
| WO | 2004068261 A2 | 8/2004 |
| WO | 2006 138019 | 12/2006 |

OTHER PUBLICATIONS

T. Alexiou et al.; "the SIP ALLOCATE Method"; SIPPING Working Group; Feb. 2002; pp. 1-9 (front and back).
"Communication Management"; XP-002103158; pp. 501-565 (front and back), 1992.
3rd Generation Partnership Project; Technical Specification Group Services and System Aspects; Voice Call Continuity between CS and IMS Study (Release 7); Global System for Mobile Communications; pp. 1-153 (front and back), 2005.
European Search Report; Mar. 27, 2007, 5 pages.
3GPP TS 23.206; '3rd Generation Partnership Project; Technical Specification Group Services and System Aspects; Voice Call Continuity between CS and IMS; Stage 2 (Release 7)'; Aug. 2006; 41 pages.
3GPP TS 24.206; '3rd Generation Partnership Project; Technical Specification Group Core Network and Terminals; Voice Call Continuity between the Circuit-Switched (CS) domain and the IP Multimedia (IP) Core Network (CN) subsystem; Stage 3 (Release 7)'; Sep. 2006; pp. 1-96.
'3GPP TSG-SB2 Meeting #55'; Oct. 23-27, 2006; pp. 1-7.
PCT Notification of Transmittal of the International Search Report and the Written Opinion of the International Searching Authority, or the Declaration; International Searching Authority; Sep. 23, 2008; 14 pages.
European Search Report; European Patent Office; Jan. 2, 2008; 14 pages.
3rd Generation Partnership Project; Technical Specification Group Services and System Aspects; Voice Call Continuity (VCC) between Circuity Switched (CS) and IP Multimedia Subsystem (IMS); Stage 2 (Release 7); Jun. 2007; 36 pages.
Korean Patent Office; Notice Requesting Submission of Opinion with English Translation; Aug. 7, 2008; 11 pages.
European Search Report; European Patent Office; Oct. 22, 2008; 8 Pages.
EPO Extended European Search Report in Application No. 09154845.3; European Patent Office; Apr. 22, 2009; 6 pages.
Digital cellular telecommunications system (Phase 2+); Numbering, addressing and identification (3GPP TS 03.03 version 5.5.0 Release 1996); Global System for Mobile Communications; Sep. 2003; 22 pages.
China Office Action, Application No. 200710007388.8; Republic of China; Oct. 30, 2009; 9 pages.
Canadian Office Action; Application No. 2,573,433; Canadian Intellectual Property Office; Apr. 15, 2010; 5 pgs.
Chinese Office Action; Application No. 200710152676.2; State Intellectual Property Office of People's Republic of China; Mar. 29, 2010; 3 pgs.
EPO Communication; Application No. 07 114 570.0; European Patent Office; Feb. 12, 2010; 4 pgs.
Mexican Office Action; Application No. MX/a/2007/012131; Mexican Patent Office; Feb. 19, 2010; 2 pgs.
AU Notice of Acceptance, Application No. 2007200056, IP Australia, Oct. 27, 2010, 3 pgs.
AU Notice of Acceptance, Application No. 2007221777, IP Australia, Oct. 14, 2010, 3 pgs.
CA Office Action, Application No. 2,596,774, Canadian IPO, Dec. 14, 2010, 10 pgs.
CN Office Action, Application No. 200710002106.5, Chinese IPO, Jan. 10, 2011, 2 pgs.
EP Extended European Search Report, Application No. 10184609.5, European Patent Office, Jan. 14, 2011, 8 pgs.
3GPP TSG-SA2, Meeting #55, Change Request, "Use of SIP 380 Alternative Service to Support Dynamic VDNs," Oct. 18, 2006, 7 pgs.
Chinese Office Action, Application No. 2007101624074, State Intellectual Property Office of People's Republic of China, Jun. 11, 2010, 4 pgs.
Chinese Office Action, Application No. 200710194436.9, State Intellectual Property Office of People's Republic of China, Jun. 2, 2010, 8 pgs.
Chinese Office Action, Application No. 200710007388.8, State Intellectual Property Office of People's Republic of China, May 12, 2010, 3 pgs.
Australian Examiner's First Report, Application No. 2007200330, Australian Government IP Australia, Jul. 19, 2010, 2 pgs.
Taiwanese Office Action, Application No. 096100821, Intellectual Property Office, Jun. 8, 2010, 2 pgs.
EPO Communication Examination Report, Application No. 09154845.3, European Patent Office, Jul. 28, 2010, 3 pgs.
Australian Examiner's Second Report, Application No. 2007200056, Australian Government IP Australia, Jun. 2, 2010, 2 pgs.
Mexican Office Action; Application No. MX/a/2007/012244, Mexican IPO, Jul. 15, 2010, 2 pgs.
Japanese OA, Application No. 2007 259204, Japan IPO, Aug. 5, 2010, 4 pgs.
Japanese Office Action, Application No. 2007 210025, Japan IPO, Sep. 10, 2010, 4 pgs.
Mexican Office Action, Application No. MX/a/2007/012131, Mexican IPO, Aug. 25, 2010, 2 pgs.
Taiwanese Office Action, Application No. 096102838, Taiwan IPO, Aug. 10, 2010, 4 pgs.
Siemens AG, "Interworking Between the IMS Messaging Service and SMS or MMS," Sep. 16, 2006, 4 pgs.
European Communication Examination Report, Application 10 179032.7, European Patent Office, Oct. 29, 2010, 5 pgs.
European Communication Examination Report, Application 09 161805.0, European Patent Office, Nov. 2, 2010, 4 pgs.
European Communication Extended Search Report, Application 10 180747.7, European Patent Office, Nov. 5, 2010, 6 pgs.
Mexican Office Action, Application No. MX/a/2007/009711, Mexican IPO, Feb. 4, 2010, 2 pgs.
European Patent Office; EP Search Report for Application No. 06118838.9-1244; Jan. 23, 2007; 6 pages.
3rd Generation Partnership Project; Technical Specification Group Services and System Aspects; Voice Call Continuity between CS and IMS Study; Global System for Mobile Communications; Release 7; Dec. 2005; pp. 1-153.
T. Alexiou et al.; The SIP Allocate Method; Sipping Working Group; Feb. 2002; pp. 1-9.
Examiner's First Report for Application No. 2007221785; Australian Government, IP Australia; Jan. 29, 2009; 2 pages.
CIPO, Office Action, Application No. 2,605,098, Mar. 4, 2011, 4 pgs.
CIPO, Office Action, Application No. 2,605,102, Mar. 3, 2011, 4 pgs.
EPO, Examination Report, Application No. 07114570.0, Apr. 11, 2011, 7 pgs.
JPO, Office Action, Application No. 2007-015879, Apr. 20, 2011, 4 pgs.
TIPO, Office Action, Application No. 096129747, Apr. 6, 2011, 4 pgs.
TIPO, Office Action, Application No. 096136933, Mar. 24, 2011, 6 pgs.

* cited by examiner

SYSTEM AND METHOD FOR MANAGING CALL CONTINUITY IN IMS NETWORK ENVIRONMENT USING SIP MESSAGING

FIELD OF THE DISCLOSURE

The present patent disclosure generally relates to call processing in communications networks. More particularly, and not by way of any limitation, the present patent disclosure is directed to a system and method for managing call continuity in a network environment including a circuit-switched (CS) network and an IP multimedia subsystem (IMS) network using Session Initiation Protocol (SIP) messaging.

BACKGROUND

Mobile voice-over-IP (VoIP) handover is the process of continuing a voice call as a user moves between IP-based packet-switched (PS) networks (e.g., wireless LAN (WLAN) or Wi-MAX networks, etc.) and circuit-switched (CS) cellular networks. To effectuate such handover, current $3^{rd}$ Generation Partnership Project (3GPP) standards specify that when a dual mode wireless user equipment (UE) device originates a call requesting inter-domain continuity, the call be routed to a call continuity control function (CCCF) element that is disposed in a new, IP-based network architecture referred to as the IP multimedia subsystem (IMS). One of the proposed solutions to implement the call routing process involves providing a Public Service Identity in the form of an E.164 number (e.g., a called party number) to which a call reference identity may be appended to generate an IP multimedia routing number (IMRN), also referred to as Voice Call Continuity (VCC) Domain Transfer Number (VDN) in the 3GPP TS 23.206 specification. However, when call reference identity digits are appended to the E.164 number, it results in a number that is longer than the 15-digit length limitation specified under the ITU-T standards. It is therefore possible that the extra digits may be lost when such a number is routed via a network. Further, if there is a reliance on the Caller ID information being provided to the VCC application or CCCF element in the IMS network, this information may be lost in the international ISDN infrastructure using the ISDN User Part (ISUP) signaling. Additionally, since IMS is designed to support multiple registrations of a common Public Identity from different UE devices, establishing correct call legs becomes paramount in effectuating call continuity.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
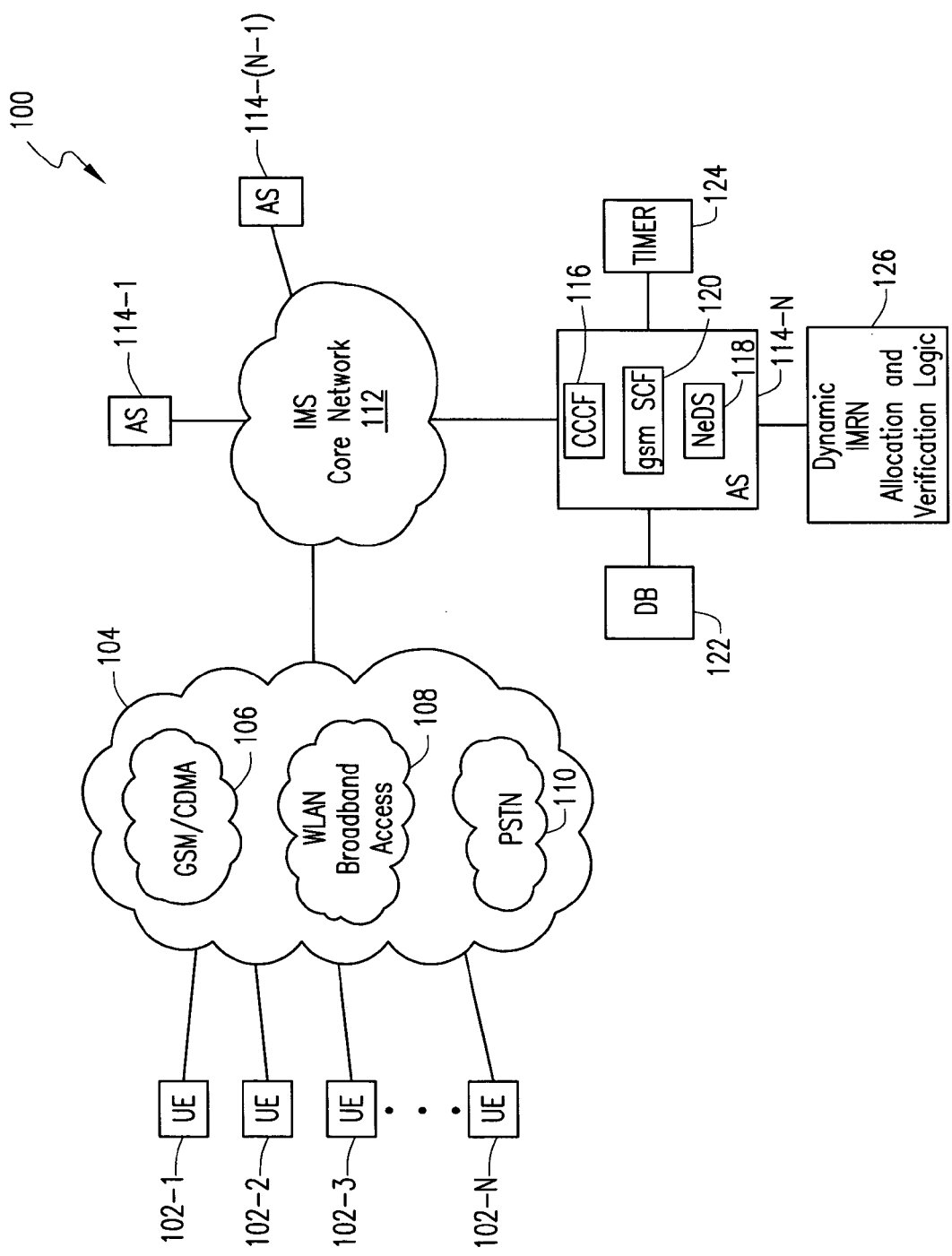
FIG. 1 depicts a network environment including circuit-switched network infrastructure and IM multimedia subsystem (IMS) infrastructure wherein an embodiment of the present patent disclosure may be practiced.

The present patent disclosure is broadly directed to a scheme for managing call continuity in a network environment including a circuit-switched (CS) network and an IP multimedia subsystem (IMS) network wherein a Session Initiation Protocol (SIP) Invite message (or another SIP Request) having a URI contained in the Request-Uniform Resource Identifier (R-URI) field that is known at an application server as an indication to provide a routable number that can be used in the CS domain is utilized. That is, the URI contained in the Request-URI field is hosted by the application server and is operable as a request for a CS domain routable number to be provided by the application server. Examples of such routable numbers include VDNs, IMRNs, E.164 numbers, etc. Responsive to the SIP Invite message from a UE device, a network node provides a SIP response message, e.g., Alternative Service Response message (also referred to as SIP 380 Response), which includes one or more radio access technologies (RATs) and an alternative domain available to the UE device for continuing a call from one domain to another domain. Preferably, the available RATs and alternative domain information may be based on the location of the UE device.

Included in the SIP Invite message is certain unique ID information that may comprise an Address of Record (AOR), a Globally Routable User Agent Uniform Resource Identifier (GRUU), and/or an Instance ID for identifying an on-going call, or any combination thereof. The Instance ID could be IMEI, IMEISV, MIN, ESN, UUID, MAC address, a software ID (such as, e.g., a mobile software terminal identifier) or any other unique Layer-2 address that could be used to uniquely identify the UE device. When a call is originated by the UE device, call information associated with the call, including the unique ID information, is provided to a server/node disposed in the IMS network. This may be based on the dialog information contained in the Invite in a SIP Header (such as the Target-Dialog header or the Same-Session header) or contained in the body of the Invite message (such as in a SIPfrag body). At the network node, a pool of E.164 numbers are maintained as IP multimedia routing numbers (IMRNs) (which are also known as Voice Call Continuity (VCC) Domain Transfer Numbers or VCC Directory Numbers (VDNs) in the 3GPP TS 23.206 specification) that can be dynamically allocated for association with at least a portion of the call information received from the UE device in order to identify ongoing calls, for example. For purposes of the present patent disclosure, "VDN" and "IMRN" are used interchangeably (more generally "routable number"), wherein basically both refer to a routable telephone number that is used to route to an IMS application server where the ability to handover from one domain to another exists. Furthermore, allocation of a routable number is dynamic in the sense that it is unique in some form that identifies a unique ongoing call. The number could be from a pool of numbers or it could be some algorithmic number that may be created using specific variables. A chief characteristic of the routable number is that it is unique for a period of time, which can be variably configurable. Accordingly, this unique number may be deemed as a "revolving" number that has a life span defined by a suitable timer mechanism.

Responsive to receiving the SIP Invite message when the UE device determines to continue the call in a different domain, the network node associates a select routable number (i.e., IMRN or VDN) with at least a portion of the call information in a mapping relationship, and returns it to the UE device via the SIP 380 Response message that may also include available RATs, an alternative domain as well as additional information as applicable. Preferably, the body of the SIP 380 Response message is coded in a suitable Markup Language (e.g., Extensible Markup Language or XML). When the dynamically allocated IMRN is transmitted by the UE device back to the network node for call setup in the other domain, the network node utilizes the IMRN mapping to effectuate call continuity with respect to the called party. The IMRN may then be released back to the pool of IMRNs for future use. Appropriate timers may be provided at the device and network endpoints so that it can be verified whether a call reference number associated with the call remains valid (e.g., it has not timed out) or the dynamically allocated IMRN remains valid (e.g., it has not timed out). Optionally, the released IMRN may be quarantined for a period of time.

Those skilled in the art should appreciate that although the embodiments set forth above describe specific SIP messages (i.e., Invite requests and SIP 380 Response messages), the functionalities may be obtained in other messaging implementations as well. In one aspect, an embodiment of a call continuity method is disclosed in the present patent application that is operable with a UE device in association with a call in an IMS network. The claimed embodiment comprises: providing, via a SIP Invite message, call information associated with the call by the UE device to a network node disposed in the IMS network, the SIP Invite message including a URI that is known to a SIP application server, e.g., a VCC application server, as an indication to provide a routable number such as IMRN or VDN (i.e., the URI is operable as an invocation for call continuity); responsive to receiving a dynamically allocated routable number from the network node via a SIP response message (e.g., SIP Alternative Service 380 Response message), verifying that a call reference number associated with the call is valid; and upon verification, providing the dynamically allocated routable number by the UE device to the network node for effectuating call continuity. For purposes of the present patent disclosure, the URI that is operable to be treated as a VCC invocation involving a request for a routable number may be denoted as a Domain Transfer-URI (DTR-URI) or a VCC Domain VDN Number URI (VVNU) that is processed at a VCC node or Domain Transfer Function (DTF).

In another aspect, disclosed herein is an embodiment of a UE device operable to continue a call using inter-domain continuity in an IMS network. The claimed embodiment comprises: means for providing, via a SIP Invite message, call information associated with the call to a network node disposed in the IMS network, the SIP Invite message including a URI that is operable with respect to VCC invocation; means, operable responsive to receiving a dynamically allocated routable number (e.g., IMRN or VDN) from the network node via a SIP response message (e.g., SIP Alternative Service 380 Response), for verifying that a call reference number associated with the call is valid; and means, operable responsive to verification, for providing the dynamically allocated routable number to the network node for effectuating call continuity.

In yet another aspect, disclosed herein is an embodiment of an IMS network node, comprising: means for verifying that a SIP Invite message received from a UE device includes a URI that is operable with respect to call continuity at a SIP application server, e.g., a VCC application server; and means for generating a SIP response message (e.g., SIP Alternative Service 380 Response) to be provided to the UE device, wherein the SIP response message is operable to include at least one of a dynamically allocated IMRN, one or more radio access technologies and an alternative domain operable with the UE device.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for managing call continuity with respect to a call originated by a UE device. As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Reference numeral 108 refers to broadband access networks including wireless local area networks or WLANs, Wi-MAX networks as well as fixed networks such as DSL, cable broadband, etc. Thus, for purposes of the present disclosure, the access technologies may comprise radio access technologies selected from IEEE 802.11a technology, IEEE 802.11b technology, IEEE 802.11g technology, IEEE 802.11n technology, GSM/EDGE Radio Access Network (GERAN) technology (both CS and PS domains), and Universal Mobile Telecommunications System (UMTS) technology, and Evolution-Data Optimized (EVDO) technology, and so on. Additionally, also exemplified as part of the access space 104 is the conventional wireline PSTN infrastructure 110 illustrated in FIG. 1.

An IP multimedia subsystem (IMS) core network 112 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push- To-Talk (PTT), etc. IMS manages applications by defining common control components that each application server (AS) is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

Continuing to refer to FIG. 1, reference numerals 114-1 to 114-N refer to a plurality of AS nodes operable to support various services, e.g., VCC, PTT, etc., as alluded to hereinabove. Particularly, a VCC AS node 114-N is operable to effectuate call continuity and appropriate domain selection with respect to calls originated by VCC-capable devices. Typically, AS 114-N may be provided as part of the subscribers' home IMS core network which implements functionality referred to as call continuity control function (CCCF) 116 and network domain selection (NeDS) 118. In essence, the CCCF portion 116 of AS 114-N is operable as a new IMS application server element that resides in the home IMS network and tracks all call sessions and related mobile voice-over-IP (VoIP) bearer traffic, including call handover/routing between CS and IMS domains. The NeDS portion 118 of AS 114-N is responsible for performing, inter alia, registration/de-registration management between the IMS and CS networks (e.g., GSM or CDMA). Despite being potentially separate functions, it is possible to integrate both the CCCF and NeDS functionalities into a single IMS-compatible network element 114-N as illustrated in FIG. 1. Also, a suitable session control function (SCF) 120 may be provided as part of the VCC AS node 114-N with respect to applicable radio access technology, e.g., gsmSCF. Additional VCC-related functional entities may include the following: Domain Transfer Function (DTF) (also referred to as Functional Entity FE-A), CS Adaptation Function (CSAF) (also referred to as FE-B), CAMEL Service (also referred to as FE-C), and Domain Selection Function (DSF) (also referred to as FE-D), which form a "VCC Application". Accordingly, for purposes of the present disclosure, the term "network node" with reference to an IMS core network (such as, e.g., AS 114-N) may comprise one or more of the following functionalities in any combination as applicable: FE-A through FE-D, gsmSCF, CCCF, and NeDS, as well as additional service logic described in detail hereinbelow.

Furthermore, although not shown in FIG. 1, a master user database, referred to as a Home Subscriber Server or HSS, is provided as part of the home IMS network 112, for supporting the various IMS network entities that actually manage calls or sessions such as VCC node 114-N. In general, the HSS database may contain user profiles (i.e., subscription-related information), including various user and device identifies such as International Mobile Subscriber Identity (IMSI), Temporal Mobile Subscriber Identity (TMSI), International Mobile Equipment Identity (IMEI), Mobile Subscriber ISDN Number (MSISDN), Universally Unique Identifier (UUID), as well as additional IMS-specific identities such as IM Multimedia Private Identity (IMPI) and IP Multimedia Public Identity (IMPU) that are implemented as Tel-Uniform Resource Identifiers (URIs) or SIP-URIs. Whereas the IMPI is unique to a particular user in a 3GPP system (i.e., (I)SIM) or could be unique to a particular UE device in another technology, it is possible to have multiple Public Identities (i.e., IMPUs) per IMPI. Further, the IMPU can also be shared with IMPI such that two or more devices can be reached with the same identity (e.g., a single phone number for an entire family).

Additionally, appropriate database structures (e.g., DB 122), timer mechanisms (e.g., timer 124) and suitable logic 126 may be provided in association with AS 114-N for purposes of configuring and managing a pool of IP multimedia routing numbers (IMRNs), also referred to as VCC Directory Numbers or VDNs, from which a select IMRN/VDN may be dynamically allocated for purposes of managing call routing and call continuity. Further, DB 122 is also operable to store a number of URIs that are used to invoke VCC service at the VCC node. However, as alluded to previously with respect to the treatment of Request-URIs, the VCC node knows from receipt and inspection of the Request-URI that the requesting UE device is desirous of invoking VCC service. As will be described in greater detail below, when a SIP Invite message is transmitted by a UE device to the VCC node, appropriate service logic at the node is operable to interpret and process the Invite message as a request for a VDN in order to effectuate call continuity.

In accordance with the teachings of the present patent disclosure, the IMS network node having the CCCF capability is preferably provided with appropriate logic/structure/software/firmware module(s) for performing the following: verifying that a SIP Invite message received from a UE device includes in the Request-URI field a URI that is operable as a VCC invocation (i.e., DTR-URI); and generating a suitable SIP response message (e.g., SIP Alternative Service 380 Response message) to be provided to the UE device, wherein the SIP response message is operable to include at least one of a dynamically allocated IMRN/VDN, one or more radio access technologies and an alternative domain operable with the UE device. The IMS node or VCC application is accordingly operable to analyze the Request-URI field and determine that it is a URI that requires a VDN to be allocated to an ongoing call for UE and user identified by the GRUU received in the SIP Invite message. To assign and manage the VDNs or IMRNs, the network node also includes suitable logic/structure/software/firmware for maintaining a pool of E.164 numbers that are operable as IMRNs which terminate on the network node; dynamically allocating a select IMRN to a called party number and/or certain unique ID information (e.g., GRUU) received from a UE device and providing the select IMRN to the originating UE device; verifying that the select IMRN has not timed out when that select IMRN is returned to the network node for effectuating a call routing/continuity process with respect to the called party number; and optionally, quarantining the select IMRN for a period of time upon releasing it back to the IMRN pool for future use. Thus, the IMRN or group of IMRNs may be stored in the VCC application server as operational configurable data, or by inspection of the format, the VCC application is operable to determine what the IMRN/VDN is for.

To manage a pool of dynamically allocable IMRNs, the network node (e.g., VCC AS 114-N) may be configured in a number of ways with respect to the E.164 numbers. For example, a particular E.164 number may be provided as a "starting address" number of an IMRN range. Another E.164 number may operate as a range delimiter with respect to the IMRN range. To allow flexibility, it may be desirable to provide for different pools of IMRNs to be configured from different number ranges. Further, appropriate timer mechanism(s) may be implemented at the network node in order to ensure that the allocated IMRNs remain valid (e.g., they have not timed out, that is, they are used within appropriate time limits) or suitable quarantine times are applied. As will be described in detail below, management of timers associated with IMRNs at the network node and timers associated with call reference numbers at the originating UE device allows for dynamic provisioning of IMRNs that could be used for call routing/continuity without having to append extra digits to the E.164 number to create an IMRN.

In one embodiment, the following steps are typically involved for effectuating call continuity using the SIP messaging. When the UE device determines a need for domain transfer (i.e., an existing call needs to be continued in a domain that is different from the domain in which it was originated), it sends a SIP Invite message directed to a PSI, i.e., a Request-URI that contains a URI that is operable to provide a VDN back. The SIP Invite message possibly contains information that enables the VCC network node to correlate the request with the existing SIP dialog of the call to be transferred (e.g., using a SIP Header such as the Target-Dialog header or the Same-Session header, or contained in the body of the Invite such as in SIPfrag body). Upon receipt of the Invite message, the service logic at the VCC network node is operable to determine that the received Invite message is a request for a VDN. The VCC application node is operable to verify that there is a SIP dialogue (i.e., call session) in progress for the received call information in the SIP Invite message and thereafter, the network node allocates a dynamic VDN that uniquely identifies the existing call in the domain currently active (e.g., an IMS/PS domain call via a WLAN), based on the call ID/SIP dialog information provided by the UE device (e.g., based on the dialog information contained in the Invite message in a SIP Header (such as the Target-Dialog header or the Same-Session header) or contained in the body of the Invite (such as in SIPfrag body)). The dynamic VDN as well as available RATs and alternative domain information is sent back to the UE device via a SIP response message (e.g., SIP Alternative Service 380 Response). It should be appreciated that other 3xx response codes could also be used for effectuating this VCC domain transfer functionality. If the UE is not attached to the CS domain (assuming that the ongoing PS domain call needs to be continued in the CS domain), the UE first performs a CS Attach procedure and then originates a voice call setup using the dynamically assigned VDN. A particular RAT and network may be selected based on the information provided in the SIP 380 Response. These processes will be described in additional detail below.

Figure 2A:
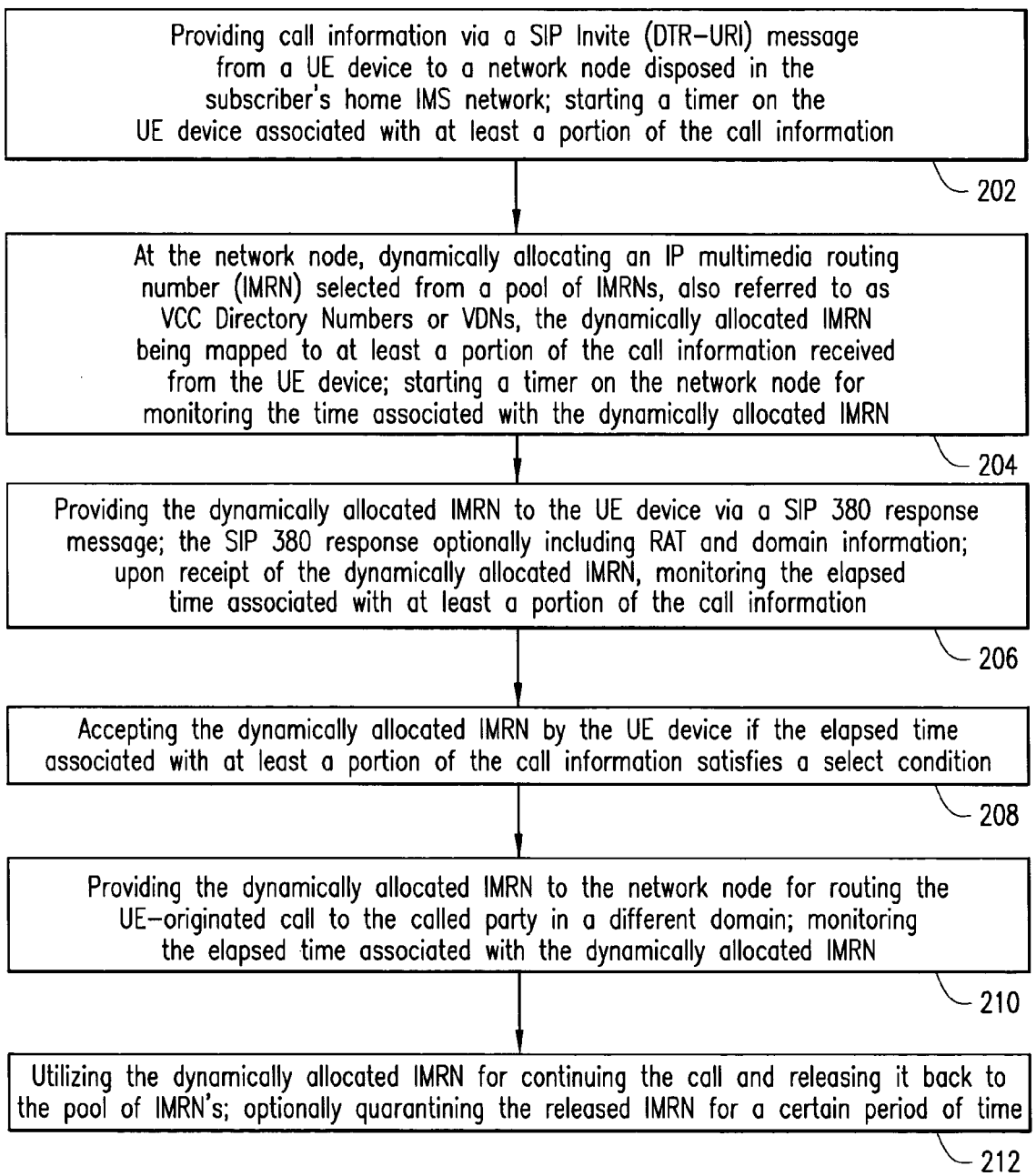
FIGS. 2A-2C depict flowcharts associated with one or more exemplary embodiments of the present patent disclosure.

FIG. 2A depicts a flowchart of an exemplary embodiment of an overall methodology of the present patent disclosure for managing call routing/continuity with respect to a call by a UE device. At block 202, various pieces of information relating to the call (which may be collectively referred to as "call information" herein), such as a call reference number or SIP dialog associated with the call as well as unique ID information associated with the UE, and a Request-URI are provided by the originating UE device to an IMS network node, e.g., VCC network node 114-N, via a SIP Invite message. As pointed out previously, the Request-URI is a SIP identifier or field that contains a URI (i.e., DTR-URI or VVNU) that is known as an operable trigger to return a VDN that the UE device logic uses in invoking domain transfer. With respect to provisioning the DTR-URIs, a number of implementations are possible. In one embodiment, one or more DTR-URIs in the form of SIP-URIs or Tel-URIs may be stored in a removable storage module (Universal Subscriber Identity Module (USIM) or Removable User Identity Module (RUIM)). Alternatively, they may be stored in a memory circuit integrated within the device. Regardless, the DTR-URIs may be provisioned for a particular UE device using Open Mobile Alliance (OMA) Device Management (DM) or other Over-the-Air (OTA) mechanisms using Short Message Service (SMS), Unstructured Supplementary Service Data (USSD) messaging, or IP transport such as GPRS, I-WLAN, etc., or provisioned using the SIP Configuration Framework. In a further embodiment, the DTR-URIs may be dynamically allocated to a UE device by the IMS network at the time of registration using P-associated URI header or in another SIP Header in a SIP 2000K message. In a still further embodiment, if there is no stored DTR-URI available for a VDN request, it may be generated from the user ID information associated with the UE device such as IMSI, Public or Private User ID, etc. Examples using IMSI include:

"<VDN-tag><IMSI>@ims.mnc<MNC>.mcc<MCC>.3gppnetwork.org
"<IMSI><VDN-tag>@ims.mnc<MNC>.mcc<MCC>.3gppnetwork.org Examples using Private User ID include:

Username<VDN-tag>@homenetwork.com
<VDN-tag>Username @homenetwork.com

Where stored, the textual representation of DTR-URIs may be as follows:

<VDN-tag>@label.label
Username<VDN-tag>@homenetwork.com
<VDN-tag>Username@homenetwork.com
<VDN-tag>@homenetwork.com Further, the URIs may be coded in memory as exemplified in the Tables below:

TABLE I

| Identifier: '6FXY' | Structure: linear fixed | Mandatory |
|---|---|---|
| SFI: 'XY' Record length: X bytes | Update activity: low | |
| Access Conditions: | | |
| READ | PIN | |
| UPDATE | ADM | |
| DEACTIVATE | ADM | |
| ACTIVATE | ADM | |

| Bytes | Description | M/O | Length |
|---|---|---|---|
| 1 to X | URI TLV data object | M | X bytes |

TABLE II

| Identifier: '6FXY' | Structure: linear fixed | Mandatory |
|---|---|---|
| SFI: 'XY' Record length: X bytes | Update activity: low | |
| Access Conditions: | | |
| READ | PIN | |
| UPDATE | ADM | |
| DEACTIVATE | ADM | |
| ACTIVATE | ADM | |

TABLE II-continued

| Bytes | Description | M/O | Length |
|---|---|---|---|
| 1 | Number of VDNs | M | 1 byte |
| 2 to X | URI TLV data object | M | X bytes |

The unique ID information relating to a call may comprise a GRUU associated with the user and UE device and/or an Instance Identifier (ID), wherein the Instance ID may include at least one of an IMEI, an IMEI Software Version (IMEISV), a MAC address or a unique Layer-2 address, an Electronic Serial Number (ESN), a software ID such as mobile software terminal identifier, a Universally Unique Identifier (UUID), and a Mobile Identification Number (MIN) provided with the device. As illustrated in block 202, a timer may be initiated on the UE device that is used for monitoring at least a portion of the call information. In particular, the timer is implemented for monitoring the elapsed time since a particular call reference number is generated and forwarded to the network node. At the network node, the SIP Invite message with the Request-URI is processed as a VDN request. Accordingly, a VDN/IMRN selected from the pool of VDN/IMRNs is dynamically associated with respect to the call reference number or, wherein the IMRN is mapped to the at least a portion of the call information, e.g., SIP dialog ID, Instance ID and/or GRUU (block 204). Also, a timer may be started at the network node for monitoring a time-to-live variable associated with the dynamically allocated IMRN. Thereafter, the dynamically allocated IMRN as well as alternative domain and available RAT information is provided to the UE device using an appropriate SIP 380 Response message. Upon receipt of the dynamically allocated IMRN at the UE device, the elapsed time associated with the call reference number is monitored to ensure that it is not stale (block 206). The dynamically allocated IMRN is accepted by the UE device if the time elapsed satisfies a select condition, e.g., within a time-to-live value (block 208). Appropriate setup is then initiated by the UE device using the dynamic IMRN, whereby the accepted IMRN is returned to the network node since it terminates on the network node. Upon receipt of the IMRN at the network node, its time-to-live variable is monitored to ensure that it has not timed out. Thereafter, the called party number, GRUU and/or Instance ID (i.e., unique ID data) associated with the dynamically allocated IMRN is utilized for continuing the call by making the appropriate inter-domain connection between the call legs (block 210). In one implementation, the dynamic IMRN may optionally be returned back to the pool of IMRNs wherein it may be quarantined for a certain period of time before it is reused or becomes available for future use (block 212).

Figure 2B:
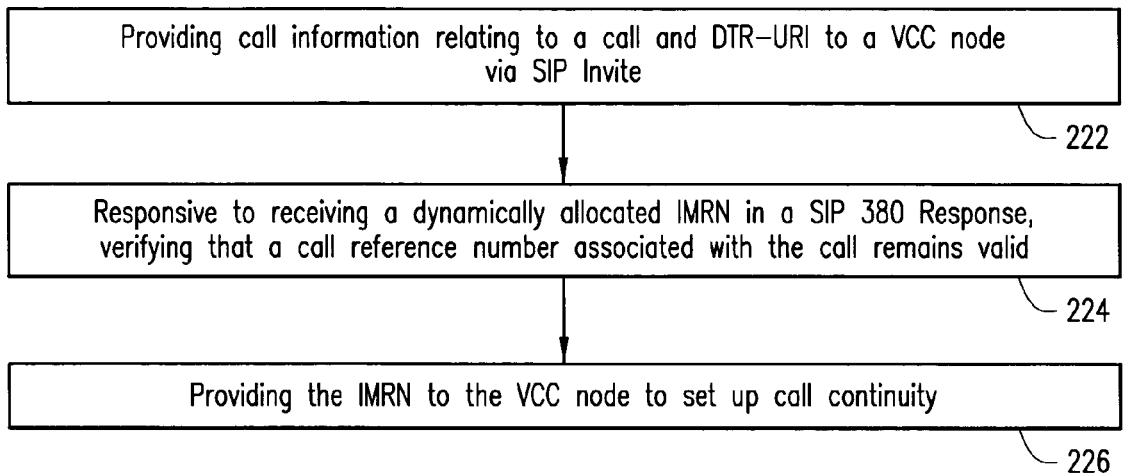
Figure 2C:
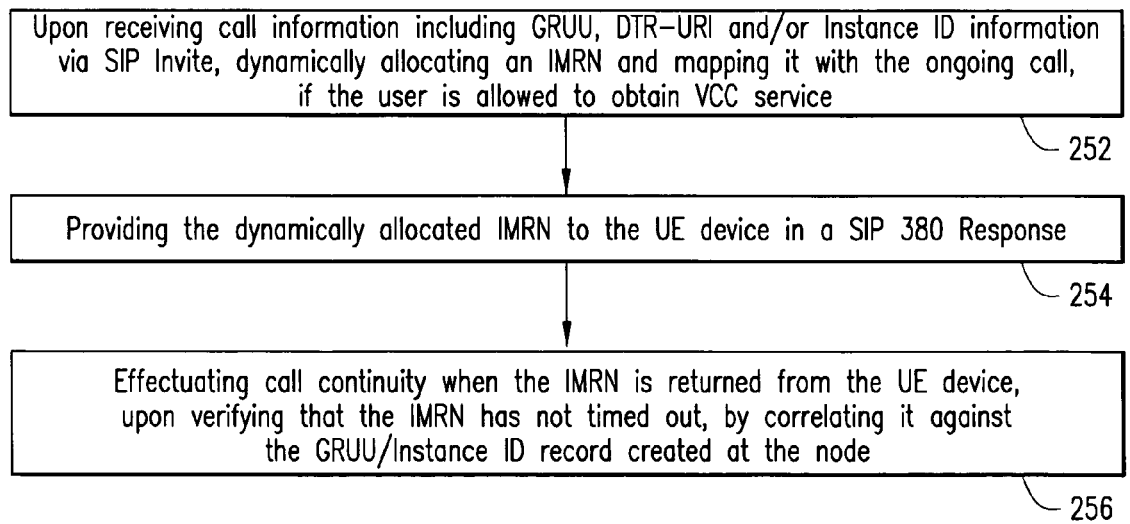

Referring now to FIGS. 2B and 2C, device-centric and network-centric portions of the above methodology are set forth in additional detail in an exemplary embodiment. At block 222, appropriate logic of the UE device is operable to provide the call information relating to a call and the DTR-URI (that is known to return a VDN) to a VCC node such as AS 114-N in FIG. 1. Responsive to receiving a dynamically allocated VDN/IMRN and domain/RAT information via a SIP 380 Response, the UE device is operable to verify that a call reference number associated with the call remains valid (block 224). Upon verification, the UE device thereafter provides the VDN/IMRN to the VCC node to set up an outgoing call leg to maintain continuity with an existing call in a different domain (block 226).

With respect to the operations at the network node, e.g., AS 114-N, upon receiving the Request-URI as well as call information including GRUU and/or Instance ID information, etc. via a SIP Invite message, appropriate logic at the node interrogates its databases to perform a number of verifications. A verification may be made to determine whether the user is allowed to obtain VCC service. Another verification relates to whether the unique ID information received from the UE device exists in the network node's databases, one example being that the received unique ID already has a SIP dialogue in progress, and if so, a VDN/IMRN that could be dynamic is allocated and associated with an ongoing call corresponding to the received unique ID information. These processes are exemplified in block 252. Thereafter, the dynamic VDN/IMRN and alternative domain/RAT information are provided to the UE device via a suitable SIP 380 Response message (block 254). As alluded to previously, the body of the SIP 380 message may be coded in XML to provide various pieces of information relating to RATs as well as alternative CS or PS domains available to the UE device. In one implementation, such information may be modulated further, based on the UE device's location for example. Alternatively, where subscriber profiles relating to preferred and/or forbidden networks are available to the service logic at the network node, additional filtering may take place before the SIP 380 Response message is suitably encoded. When the dynamic IMRN is returned to the network node as part of the UE's VCC call leg setup, the network node correlates the returned IMRN against the GRUU/Instance ID record created previously in order to link the VCC call leg with respect to the ongoing call (block 256). Also, the network node may include appropriate logic to verify that the received IMRN has not timed out, as set forth hereinabove.

Based on the foregoing, those skilled in the art will appreciate that the VCC application logic at the network node preferably includes the functionality to examine the Request-URI received via a SIP Invite message to determine if URI contained in that Request-URI field is associated with VCC invocation. If associated with VCC invocation, the contents of the Request-URI are not utilized by the VCC node for call completion. Instead, the application logic verifies if there is an ongoing call for the received User ID or GRUU or based on the dialog information contained in the Invite in a SIP Header or contained in the body as described previously. In one implementation, if there is no ongoing call, the received SIP Invite message may be rejected. As described in detail previously, a dynamic IMRN/VDN is assigned to the GRUU based on the determination that there is an ongoing call, which may be mapped to the GRUU as well as other pieces of the call information, e.g., P-Asserted ID parameters, B-number, etc. Additionally, the VCC application logic may be provided with the functionality to examine the P-Access-Network information header for identifying the location of the UE device. Further, location information may also be obtained using network-based location technology or could have been entered by the user and communicated to the VCC application as well. Using the location information of the UE device and the state of the device in the CS network that may be obtained from the DSF (FE-D), the application logic may appropriately set or select the RATs for use by the UE device. The access technologies to which the call handover is to be made may include, without limitation, well-known technologies such as IEEE 802.11; IEEE 802.11a; IEEE 802.11b; IEEE 802.11g; 3GPP-GERAN-CS; 3GPP-GERAN-PS; 3GPP-UTRAN-FDD; 3GPP-UTRAN-TDD; ADSL; ADSL2; ADSL2+; RADSL; SDSL; HDSL; HDSL2; G.SHDSL; VDSL; IDSL; 3GPP2-1X; 3GPP2-1X-HRPD; DOCSIS;

EVDO, CDMALX, WiMAX, etc., as well as any heretofore unknown wired and wireless access types.

Set forth below is an example of a SIP 380 Response message containing XML coded body for purposes of the present disclosure:

TABLE III

SIP/2.0 380 Alternative Service
Via: SIP/2.0/UDP pc33.atlanta.com;branch=z9hG4bKnashds8
;received=192.0.2.1
To: Bob <sip:bob@biloxi.com>;tag=a6c85cf
From: Alice <sip:alice@atlanta.com>;tag=1928301774
Call-ID: a84b4c76e66710
Contact: <tel:+1234567890>
CSeq: 314159 INVITE
Content-Type: application/3gpp-ims+xml
Content-Length: 657
<?xml version="1.0"?>
<!DOCTYPE ims-3gpp >
<ims-3gpp version="2.0">
  <alternative-service>
    <type>
      <vcc-domain-tx>
        <uri>tel:+1234567890</uri>
        <access-type>3GPP-GERAN</access-type>
        <domain-type>
          <CS/>
        </domain-type>
      </vcc-domain-tx>
    </type>
    <reason>VCC domain transfer to CS domain</reason>
  </alternative-service>
</ims-3gpp>

In other XML coding schemes, various additional elements may also be provided to indicate emergency sessions, operator-configurable text messages, etc.

Overall, the VCC application logic is operable to include the following elements in the XML body of an exemplary SIP 380 Response message:
- an <alternative-service> element, set to the parameters of the alternative service;
- a <VCC Invocation> element, set to the parameters of the VCC invocation;
- an <VDN> element, set to "VDN" to VDN number;
- a <CS> element, set to "cs" to indicate the CS domain as the alternative domain;
- a <type> child element, set to "emergency" to indicate that it was an emergency call; and
- a <reason> child element, set to an operator configurable reason, e.g., in a text message.

It should be recognized by those skilled in the art that the message flow between the UE device and the home IMS network's VCC network node may be mediated through a number of other appropriate network infrastructure elements, and may be implemented in a number of ways depending on the device capabilities as well as the network features and protocols being used. Typically, the message flow may be mediated via network elements such as a mobile switching center (MSC) and a media gateway control function (MGCF) element disposed between the UE device and its home IMS VCC/network node. Also, there may be additional IMS control plane nodes such as Interrogating Call Session Control Function (I-CSCF) nodes and Serving CSCF (S-CSCF) nodes disposed between the MGCF node and the VCC node. Set forth below is an exemplary implementation of the message flow where SIP messaging and dynamically allocated IMRNs are utilized for effectuating call routing/continuity with respect to a call originated by the UE device.

Figure 3A:
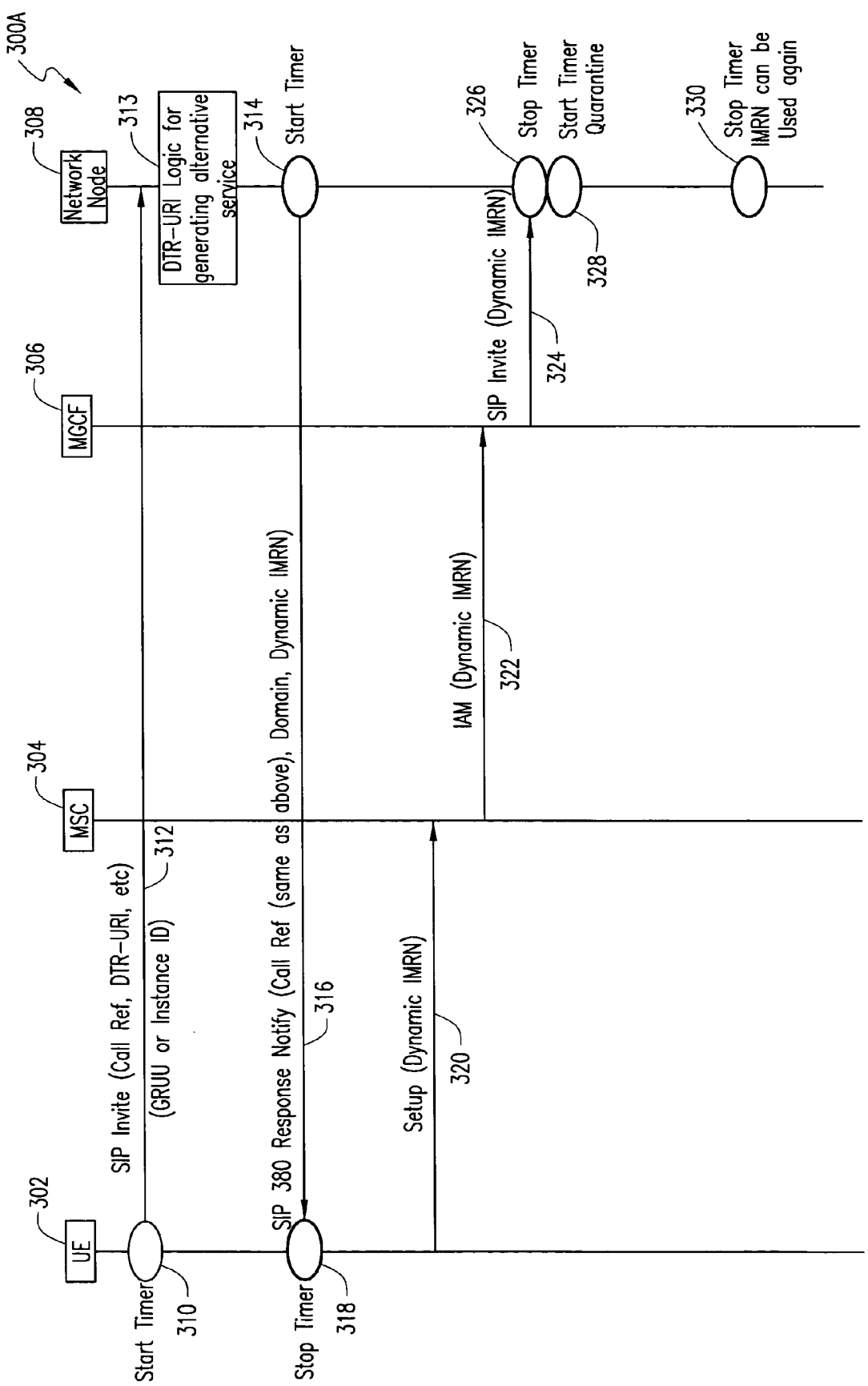
FIGS. 3A and 3B depict exemplary message flow diagrams for effectuating call continuity by employing a SIP Invite message with a DTR-URI in the Request-URI field.

FIG. 3A depicts a message flow diagram 300A for effectuating call continuity by employing a SIP Invite message with a Domain Transfer-URI in the Request-URI field in accordance with an embodiment. Exemplary UE device 302 having the CS domain and IMS domain modes of functionality is operable to generate a SIP Invite message 312 to a network node 308, wherein the Invite message includes the DTR-URI in the Request-URI as well as applicable call information such as call reference identity or number, or the SIP Dialog ID (e.g., based on the dialog information in the Invite in a SIP Header or contained in the body of the Invite), etc. in addition to the GRUU and/or Instance ID information. A suitable timer mechanism 310 may be initiated at the UE device in order to monitor a time-to-live variable associated with the call reference number. It should be appreciated that this timer may be provided in addition to normal SIP timers as this operation is known to provide a SIP 380 Response with specific information within a certain timeframe. Responsive to the Invite message 312, which may be mediated via I-CSCF and/or S-CSCF nodes, a network node 308 disposed in the user's home IMS network is operable to launch DTR-URI logic 313 for verifying, generating and populating a suitable response message (e.g., SIP Alternative Service 380 Response message) as described above. Upon verifying that the user is allowed to do a VCC call and the Invite message includes VCC invocation with respect to an ongoing call, the network node dynamically allocates a select IMRN mapped to the call and returns it back to UE device 302 via SIP 380 message 316. The dialog information contained in the Invite Header or in the body of the Invite may be used to correlate the call. A suitable timer mechanism may be started (block 314) at the network node 308 in order to monitor a time-to-live variable associated with the dynamically allocated IMRN. After verifying that the call reference has not timed out based on the UE device's timer mechanism, responsive to receipt of the SIP 380 Response message 316, UE device 302 initiates a call setup message 320 that includes the dynamic IMRN. In response, MSC 304 generates an Initial Address Message (IAM) 322 towards MGCF 306. A SIP Invite message 324 that contains the IMRN is generated by MGCF 306 towards the network node 308, which then uses the IMRN-GRUU mapping for continuing the call to the called party (not shown). The network node 308 is operable to look up its ongoing calls to see if the GRUU and/or Instance ID can be found. It should be recognized that various intermediate SIP messages and resource allocation/reservation negotiations may take place between MGCF 306 and the called party subsequent to SIP Invite 324, which are not described in particular detail herein. Also, additional ISUP messaging that takes place before a bearer path is established between the UE device 302 and the called party is not shown herein.

Upon receipt of the dynamically allocated IMRN or VDN via SIP Invite 324 at the network node 308, the timer mechanism may be stopped (block 326) to verify if the IMRN has timed out. If so, the SIP Invite message may be discarded and the call routing process may be terminated. If the IMRN has not timed out, the CCCF may set up the call leg using the original called number and link it with the ongoing session based on the GRUU-IMRN correlation. After using the IMRN for call correlation by CCCF, it may be returned to the IMRN pool, wherein a quarantine timer may be started (block 328) such that the IMRN is prohibited from further use until the quarantine timer is stopped after a period of time (block 330).

As pointed out previously, the timer mechanism at the device side may also be used to ensure that the call reference number has not timed out (e.g., using the timer mechanism 318), which reference number is used by the UE device to correlate the information received from the network node (e.g., dynamic IMRN). If the timer expires before the same reference number is received back from the network node, the UE device may reattempt the call process a predetermined number of times (e.g., five attempts), after which if no response has been received, the call procedure may be deemed to have failed. In other words, if the UE device receives a reference number that is no longer valid, it may be discarded and the call procedure may be terminated.

Figure 3B:
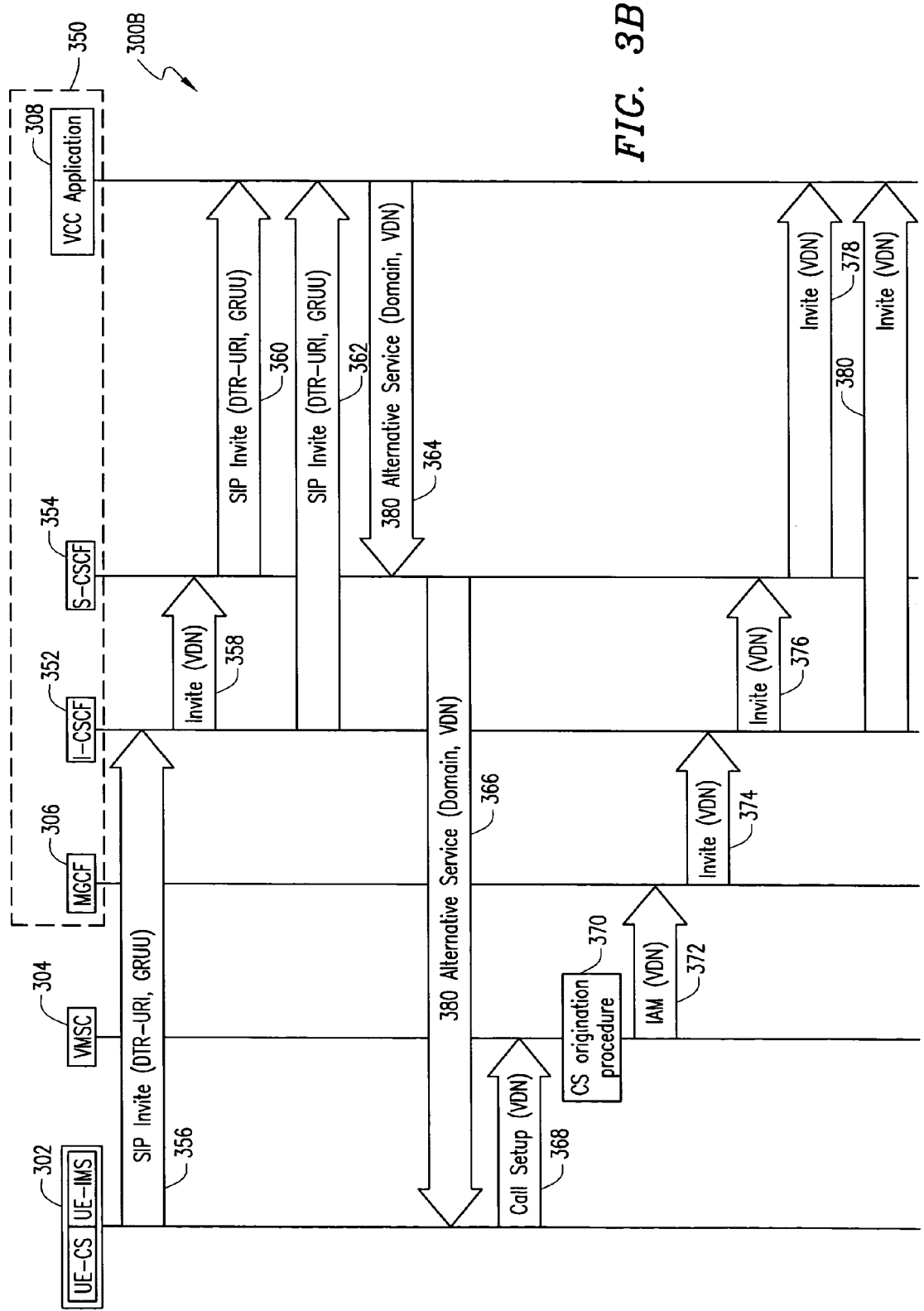

FIG. 3B depicts a message flow diagram 300B for effectuating call continuity by employing a SIP Invite message with a DTR-URI in the Request-URI field wherein certain intermediary nodes in a home network 350 are exemplified. Similar to the flow diagram embodiment 300A described above, UE device 302 is operable to generate a SIP Invite message 356 towards I-CSCF 352, wherein the SIP Invite message includes GRUU and a URI contained in the R-URI known to invoke VCC. This Invite message is propagated to VCC application 308 either directly as SIP Invite 362 or via S-CSCF 354 by way of SIP Invite messages 358 and 360. As described previously, SIP 380 (Alternative Service) Response message 364 having domain and VDN information is generated by VCC application 308 towards S-CSCF 354, which is then propagated to UE device 302 via SIP response 366. A call setup message 368 having the VDN is provided to MSC 304, which initiates a CS origination procedure 370. IAM messaging 372 from MSC 304 towards MGCF 306 is operable to generate SIP Invite 374 towards I-CSCF 352, which may be directly propagated to VCC application 308 as Invite message 380 having the VDN. Alternatively, I-CSCF 352 first provides a SIP Invite 376 to S-CSCF 354 which then propagates a SIP Invite 378 to VCC application 378. Regardless, once the VDN is received at the VCC application 308, appropriate call correlation is made for effectuating call continuity in the selected domain.

Figure 4:
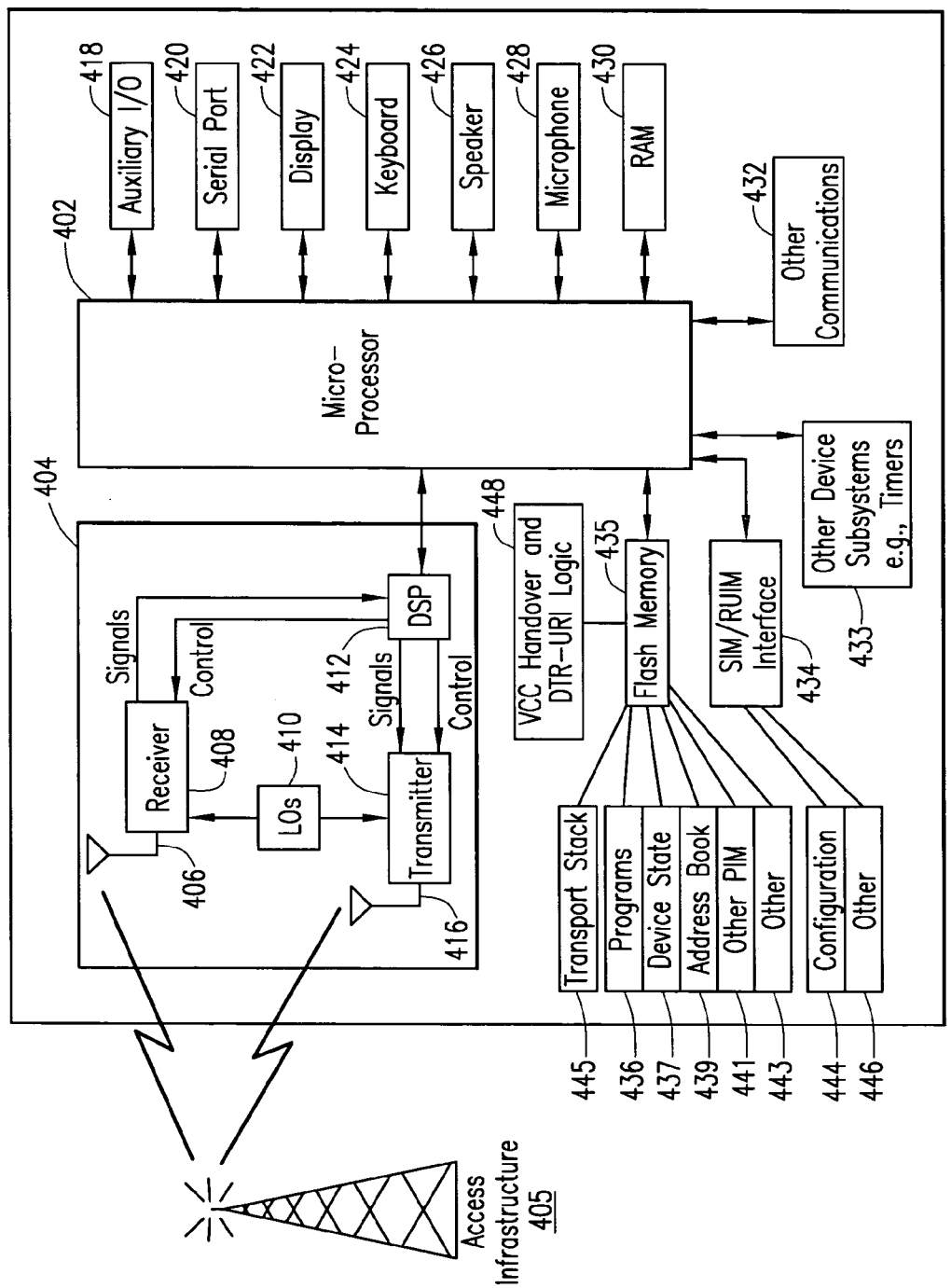
FIG. 4 depicts a block diagram of an embodiment of a communications device operable for purposes of the present patent disclosure.

FIG. 4 depicts a block diagram of an embodiment of a communications device operable as a wireless UE device, e.g., UE 302, for purposes of the present patent disclosure. It will be recognized by those skilled in the art upon reference hereto that although an embodiment of UE 302 may comprise an arrangement similar to one shown in FIG. 4, there can be a number of variations and modifications, in hardware, software or firmware, with respect to the various modules depicted. Accordingly, the arrangement of FIG. 4 should be taken as illustrative rather than limiting with respect to the embodiments of the present patent disclosure. A microprocessor 402 providing for the overall control of an embodiment of UE 302 is operably coupled to a communication subsystem 404 that is capable of multi-mode communications (e.g., CS domain, IP domain such as IMS, et cetera). The communication subsystem 404 generally includes one or more receivers 408 and one or more transmitters 414 as well as associated components such as one or more local oscillator (LO) modules 410 and a processing module such as a digital signal processor (DSP) 412. As will be apparent to those skilled in the field of communications, the particular design of the communication module 404 may be dependent upon the communications networks with which the mobile device is intended to operate (e.g., a CDMA network, a GSM network, WLAN, et cetera). Regardless of the particular design, however, signals received by antenna 406 through appropriate access infrastructure 405 (e.g., cellular base station towers, WLAN hot spots, etc.) are provided to receiver 408, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 412, and provided to transmitter 414 for digital-to-analog (D/A) conversion, frequency up conversion, filtering, amplification and transmission over the air-radio interface via antenna 416.

Microprocessor 402 may also interface with further device subsystems such as auxiliary input/output (I/O) 418, serial port 420, display 422, keyboard/keypad 424, speaker 426, microphone 428, random access memory (RAM) 430, a short-range communications subsystem 432, and any other device subsystems, e.g., timer mechanisms, generally labeled as reference numeral 433. To control access, a SIM/RUIM 434 may also be provided in communication with the microprocessor 402. In one implementation, SIM/RUIM interface 434 is operable with a SIM/RUIM card having a number of key configurations 444 and other information 446 such as R-URIs as well as identification and subscriber-related data.

Operating system software and applicable service logic software may be embodied in a persistent storage module (i.e., non-volatile storage) such as Flash memory 435. In one implementation, Flash memory 435 may be segregated into different areas, e.g., storage area for computer programs 436 (e.g., service processing logic), as well as data storage regions such as device state 437, address book 439, other personal information manager (PIM) data 441, and other data storage areas generally labeled as reference numeral 443. A transport stack 445 may be provided to effectuate one or more appropriate radio-packet transport protocols. In addition, a DTR-URI generation and call handover/continuity logic module 448 is provided for effectuating DTR-URI and call reference ID generation, validation, verification, and correlation with IMRNs, etc. as set forth hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method executing on a user equipment (UE) device having a processor for operating in association with an ongoing call in an Internet Protocol (IP) multimedia subsystem (IMS) network, said method comprising:
    providing, via a Session Initiation Protocol (SIP) Invite message, call information associated with said ongoing call in one domain to a network node disposed in said IMS network, said SIP Invite message including an indication operable as an invocation for call continuity;
    receiving a routable number from said network node via a SIP response message, wherein said SIP response message comprises a SIP 380 (Alternative Service) Response message;
    verifying that a call reference number associated with said ongoing call is valid; and
    sending a message containing said routable number to said network node for effectuating call continuity with respect to said ongoing call in another domain.

2. The method as recited in claim 1, wherein said SIP response message further includes an alternative domain available to said UE device for continuing said call.

3. The method as recited in claim 2, wherein said alternative domain comprises one of a packet-switched (PS) network domain and a circuit-switched (CS) network domain.

4. The method as recited in claim 1, wherein said routable number comprises a VCC Domain Transfer Number (VDN).

5. The method as recited in claim 1, wherein said routable number comprises an IP multimedia routing number (IMRN).

6. The method as recited in claim 1, wherein said call information includes at least one unique identity (ID) parameter associated with said UE device.

7. The method as recited in claim 6, wherein said unique ID parameter comprises at least one of a Globally Routable User Agent (UA) Uniform Resource Identifier (URI) (GRUU), an International Mobile station Equipment Identity (IMEI), an IMEI Software Version (IMEISV), an Electronic Serial Number (ESN), a Universally Unique Identifier (UUID), a Mobile Identification Number (MIN), a unique Layer-2 address, a mobile software terminal identifier, and an Instance ID associated with said UE device.

8. The method as recited in claim 1, wherein said SIP Invite message is provided upon determining that said ongoing call is to be continued from a first domain to a second domain.

9. The method as recited in claim 8, wherein said first domain comprises one of a PS network domain and a CS network domain.

10. The method as recited in claim 8, wherein said second domain comprises one of a PS network domain and a CS network domain.

11. The method as recited in claim 1, wherein said indication comprises a Uniform Resource Identifier (URI) that is stored locally in a removable storage module associated with said UE device.

12. The method as recited in claim 1, wherein said indication comprises a Uniform Resource Identifier (URI) that is stored locally in a memory circuit integrated within said UE device.

13. The method as recited in claim 1, wherein said indication comprises a Uniform Resource Identifier (URI) that is dynamically allocated to said UE device by said IMS network.

14. The method as recited in claim 13, wherein said URI is provided in one of a SIP header or a body of a SIP message.

15. The method as recited in claim 1, wherein said indication comprises a Uniform Resource Identifier (URI) that is created by said UE device based on a user ID parameter associated with said UE device.

16. The method as recited in claim 1, wherein said indication comprises a Uniform Resource Identifier (URI).

17. The method as recited in claim 1, wherein said SIP 380 (Alternative Service) Response message includes a list of radio access technologies.

18. The method as recited in claim 17, wherein said radio access technologies include technologies selected from IEEE 802.11a technology, IEEE 802.11b technology, IEEE 802.11g technology, GSM/EDGE Radio Access Network (GERAN) technology, and Universal Mobile Telecommunications System (UMTS) technology, and Evolution-Data Optimized (EVDO) technology.

19. A user equipment (UE) device operable in an Internet Protocol (IP) multimedia subsystem (IMS) network, said UE device comprising:
a processor configured to control at least one of a plurality of sub-systems to provide, via a Session Initiation Protocol (SIP) Invite message, call information associated with an ongoing call in one domain to a network node disposed in said IMS network, said SIP Invite message including an indication operable as an invocation for call continuity;
the processor further configured to control one of the plurality of sub-systems to process a routable number received from said network node via a SIP response message, wherein said SIP response message comprises a SIP 380 (Alternative Service) Response message;
the processor further configured to control one of the plurality of sub-systems to verify that a call reference number associated with said ongoing call is valid; and
the processor further configured to control one of the plurality of sub-systems to send a message containing said routable number to said network node for effectuating call continuity with respect to said ongoing call in another domain.

20. The UE device as recited in claim 19, wherein said SIP response message further includes an alternative domain available to said UE device for continuing said call.

21. The UE device as recited in claim 20, wherein said alternative domain comprises one of a packet-switched (PS) network domain and a circuit-switched (CS) network domain.

22. The UE device as recited in claim 19, wherein said routable number comprises a VCC Domain Transfer Number (VDN).

23. The UE device as recited in claim 19, wherein said routable number comprises an IP multimedia routing number (IMRN).

24. The UE device as recited in claim 19, wherein said call information includes at least one unique identity (ID) parameter associated with said UE device.

25. The UE device as recited in claim 24, wherein said unique ID parameter comprises at least one of a Globally Routable User Agent (UA) Uniform Resource Identifier (URI) (GRUU), an International Mobile station Equipment Identity (IMEI), an IMEI Software Version (IMEISV), a Universally Unique Identifier (UUID), an Electronic Serial Number (ESN), a Mobile Identification Number (MIN), a unique Layer-2 address, a mobile software terminal identifier, and an Instance ID associated with said UE device.

26. The UE device as recited in claim 19, wherein said SIP Invite message is provided upon determining that said ongoing call is to be continued from a first domain to a second domain.

27. The UE device as recited in claim 26, wherein said first domain comprises one of a PS network domain and a CS network domain.

28. The UE device as recited in claim 26, wherein said second domain comprises one of a PS network domain and a CS network domain.

29. The UE device as recited in claim 19, wherein said indication comprises a Uniform Resource Identifier (URI) that is stored locally in a removable storage module associated with said UE device.

30. The UE device as recited in claim 19, wherein said indication comprises a Uniform Resource Identifier (URI) that is stored locally in a memory circuit integrated within said UE device.

31. The UE device as recited in claim 19, wherein said indication comprises a Uniform Resource Identifier (URI) that is dynamically allocated to said UE device by said IMS network.

32. The UE device as recited in claim 31, wherein said URI is provided in one of a SIP header or a body of a SIP message.

33. The UE device as recited in claim 19, wherein said indication comprises a Uniform Resource Identifier (URI) that is created by said UE device based on a user ID parameter associated with said UE device.

34. The UE device as recited in claim 19, wherein said indication comprises a Uniform Resource Identifier (URI).

35. The UE device as recited in claim 19, wherein said SIP 380 (Alternative Service) Response message includes a list of radio access technologies.

36. The UE device as recited in claim 35, wherein said radio access technologies include technologies selected from IEEE 802.11a technology, IEEE 802.11b technology, IEEE 802.11g technology, GSM/EDGE Radio Access Network (GERAN) technology, and Universal Mobile Telecommunications System (UMTS) technology, and Evolution-Data Optimized (EVDO) technology.

37. A network node operable within an Internet Protocol (IP) multimedia subsystem (IMS) network, comprising:
a component configured to verify that a Session Initiation Protocol (SIP) Invite message received from a user equipment (UE) device includes an indication that is operable as an invocation for call continuity;
a component configured to generate a SIP response message to be provided to said UE device, wherein said SIP response message comprises a SIP 380 (Alternative Service) Response message and is operable to include at least one of an IP multimedia routing number (IMRN), one or more radio access technologies and an alternative domain operable with said UE device; and
a component configured to verify that said IMRN received back via a message from said UE device with respect to effectuating call continuity remains valid.

38. The network node as recited in claim 37, further comprising:
a component configured to associate said IMRN with a unique identity (ID) parameter received from said UE device with respect to an ongoing call.

39. The network node as recited in claim 37, wherein said radio access technologies include technologies selected from IEEE 802.11a technology, IEEE 802.11b technology, IEEE 802.11g technology, GSM/EDGE Radio Access Network (GERAN) technology, and Universal Mobile Telecommunications System (UMTS) technology, and Evolution-Data Optimized (EVDO) technology.

40. The network node as recited in claim 37, wherein said alternative domain comprises one of a packet-switched (PS) network domain and a circuit-switched (CS) network domain.

41. The network node as recited in claim 37, wherein said indication comprises a Uniform Resource Identifier (URI) that is stored in a database associated with said network node.

42. The network node as recited in claim 37, wherein said alternative domain is identified in said SIP response message in a Tel-URI format.

43. The network node as recited in claim 37, wherein said alternative domain is identified in said SIP response message in an E.164 format.

44. A method executing on a network node having a processor for effectuating call continuity, said method comprising:
verifying that a Session Initiation Protocol (SIP) Invite message received from a user equipment (UE) device includes a Request-Uniform Resource Identifier (R-URI) field that contains a URI that is adapted to operate as an invocation for call continuity;
generating a SIP response message towards said UE device, wherein said SIP response message comprises a SIP 380 (Alternative Service) Response message and includes at least one of an IP multimedia routing number (IMRN), one or more radio access technologies and an alternative domain operable with said UE device; and
verifying that said IMRN received back via a message from said UE device with respect to effectuating call continuity remains valid.

45. The method as recited in claim 44, wherein said alternative domain comprises one of a packet-switched (PS) network domain and a circuit-switched (CS) network domain.

46. The method as recited in claim 44, wherein said alternative domain is identified in said SIP response message in a Tel-URI format.

47. The method as recited in claim 44, wherein said alternative domain is identified in said SIP response message in an E.164 format.

* * * * *

UNITED STATES PATENT AND TRADEMARK OFFICE
CERTIFICATE OF CORRECTION

| | |
|---|---|
| PATENT NO. | : 7,995,565 B2 |
| APPLICATION NO. | : 11/542462 |
| DATED | : August 9, 2011 |
| INVENTOR(S) | : Buckley et al. |

It is certified that error appears in the above-identified patent and that said Letters Patent is hereby corrected as shown below:

Column 16,
Line 31, "International Mobile station Equipment" should read --International Mobile Equipment--

Signed and Sealed this
Twenty-eighth Day of February, 2012

David J. Kappos
*Director of the United States Patent and Trademark Office*